United States Patent [19]

Suzuki et al.

[11] Patent Number: 4,660,944
[45] Date of Patent: Apr. 28, 1987

[54] MIRROR ANGLE ADJUSTING ARRANGEMENT

[75] Inventors: Masaru Suzuki, Chiryu; Yoshio Tsujiuchi, Kuwana; Akira Ogawa, Aichi; Tadashi Usami, Nagoya, all of Japan

[73] Assignee: Kabushiki Kaisha Tokai Rika Denki Seisakusho, Aichiken, Japan

[21] Appl. No.: 796,295

[22] Filed: Nov. 8, 1985

[30] Foreign Application Priority Data

Nov. 8, 1984 [JP] Japan ................. 59-236258

[51] Int. Cl.⁴ ............ B60R 1/06; G02B 7/18
[52] U.S. Cl. ............... 350/635; 248/479; 248/484; 248/487; 350/604; 350/632
[58] Field of Search .......... 350/631–637, 350/604; 248/466, 476, 479, 481–484, 485–487

[56] References Cited

U.S. PATENT DOCUMENTS

| | | | |
|---|---|---|---|
| 4,168,635 | 9/1979 | Savidan | 350/635 X |
| 4,278,227 | 7/1981 | Davis et al. | 248/487 |
| 4,279,473 | 7/1981 | Yamana | 350/635 |
| 4,357,076 | 11/1982 | Manzoni | 248/487 X |
| 4,464,017 | 8/1984 | Wada | 350/635 |
| 4,548,483 | 10/1985 | Moro et al. | 248/484 X |
| 4,558,840 | 12/1985 | Manzoni | 350/635 X |
| 4,606,619 | 8/1986 | Yamana | 350/604 |

*Primary Examiner*—John Petrakes
*Attorney, Agent, or Firm*—Birch, Stewart, Kolasch & Birch

[57] ABSTRACT

In a foldable mirror provided with a mirror case foldable around rotary members on a mirror stay, a manual angle adjusting device for tilting a mirror accommodated in the mirror case, comprises a penetrating shaft vertically movably and rotatably mounted on the rotary members, a clutch member for moving a connecting portion between the clutch member and a mirror holder vertically and for rotating the connecting portion around the shaft in one unit therewith or independently, a first connecting member which is secured on the shaft rotates around it and moves vertically, second connecting members provided with a connecting shaft and a bent portion having one end connected thereto and the other end for engagement with the first connecting member so that the bent portion and the first connecting member are rotatable in opposite directions to each other and movable vertically, a third connecting member secured on the connecting shaft and movable vertically and rotatable around it, and an operating lever for connecting the third connecting member thereto so that the lever and the third connecting member are movable vertically and rotatable in opposite directions to each other.

7 Claims, 15 Drawing Figures

MIRROR ANGLE ADJUSTING ARRANGEMENT

BACKGROUND OF THE INVENTION

The present invention generally relates to an angle adjusting arrangement for mirrors and more particularly, to an angle adjusting arrangement for foldable type mirror assemblies for manually adjusting angles of external reflecting mirrors for motor vehicles from the interior of the motor vehicles.

In door mirrors or the like for motor vehicles, one of the known arrangements thereof is flexible type mirrors having a construction wherein a mirror case accommodating a mirror therein is inclined in case a large external force is applied thereto, and is restored to its original state when the external force is removed. Another known arrangement of the type mirror assemblies is foldable mirrors having a construction wherein a mirror case is capable of being folded at an angle of approximately 90° from its original position. The approximately 90° angle is larger than a maximum inclined angle of the mirror case for the above described flexible type mirror and capable of keeping its folded state. In each of the above described mirrors, there is provided a mechanism for adjusting the angles of the mirror tiltably mounted in the mirror case and in some of such mirrors, the angles of the mirrors can be remotely adjusted from the interior of the motor vehicles.

Meanwhile, although the angles of the mirrors can be remotely adjusted either electrically or manually, an electric driving system for adjusting the angles of the type mirror assemblies has been generally adopted to the foldable mirrors as described above, since it has been difficult to arrange a manually operated adjusting shaft so as not to prevent the movement of the mirror case due to a large folded angle thereof.

SUMMARY OF THE INVENTION

Accordingly, an essential object of the present invention is to provide an improved mirror angle adjusting arrangement for motor vehicles which can be employed with foldable type mirror assemblies having a construction wherein a mirror case is capable of being folded at a large angle from its original position.

Another important object of the present invention is to provide a mirror angle adjusting arrangement for motor vehicles of the above described type which is simple in construction and can be manufactured at extremely low cost.

In accomplishing these and other objects, according to one preferred embodiment of the present invention, there is provided a manual angle adjusting arrangement for foldable type mirror assemblies of a motor vehicle and the like. The foldable type mirror assemblies are provided with a mirror case foldable around rotary members on a mirror stay arranged on an outer surface of the motor vehicle and accommodating the mirror rigidly mounted on a mirror holder which is tiltable around a ball joint member thereof. The foldable type mirror assemblies are provided with a penetrating shaft vertically movable. A clutch member is rotatably mounted, on the penetrating shaft, having its rotational axis spaced from a ball joint member supporting the mirror holder. The ball joint member connects one end of the penetrating shaft and a connecting portion between of the clutch member with the mirror holder in the vicinity of the ball joint member. The connecting portion is movable with the penetrating shaft in a vertical direction and independently rotatable about the penetrating shaft. A first connecting member is secured on the other end of the penetrating shaft and is rotatable with the penetrating shaft and can be moved vertically. Second connecting members comprising a connecting shaft, positioned approximately parallel to the axial direction of the penetrating shaft, and a bent portion, which extends in a direction approximately perpendicular to the connecting shaft, having one end connected to the lower end thereof and the other end for engagement with the first connecting member so that the bent portion and the first connecting member are capable of rotating in opposite directions to each other and moving vertically in one unit. A third connecting member is secured on an upper end of the connecting shaft of the second connecting member and is capable of moving vertically and rotating around the connecting shaft in one unit therewith, and an operating lever having one end situated inside of the motor vehicle, the other end extending through the mirror stay outwardly and a ball element therebetween, for connecting the other end thereof with one end of the third connecting member so that the lever and the third connecting member are capable of moving vertically in one unit and rotating in opposite directions to each other, with both ends of the lever being rotatable around the ball element thereof.

BRIEF DESCRIPTION OF THE DRAWINGS

These and other objects and features of the present invention will become apparent from the following description taken in conjunction with the preferred embodiment thereof with reference to the accompanying drawings, in which:

FIGS. 10(1) and 10(2) are sectional views each showing a state where the pin is held in a retaining concave portion on the disc or the pin is released from the retention thereof in the concave portion, respectively;

DETAILED DESCRIPTION OF THE INVENTION

Before the description of the present invention proceeds, it is to be noted that like parts are designated by like reference numerals throughout the accompanying drawings.

Figure 1:
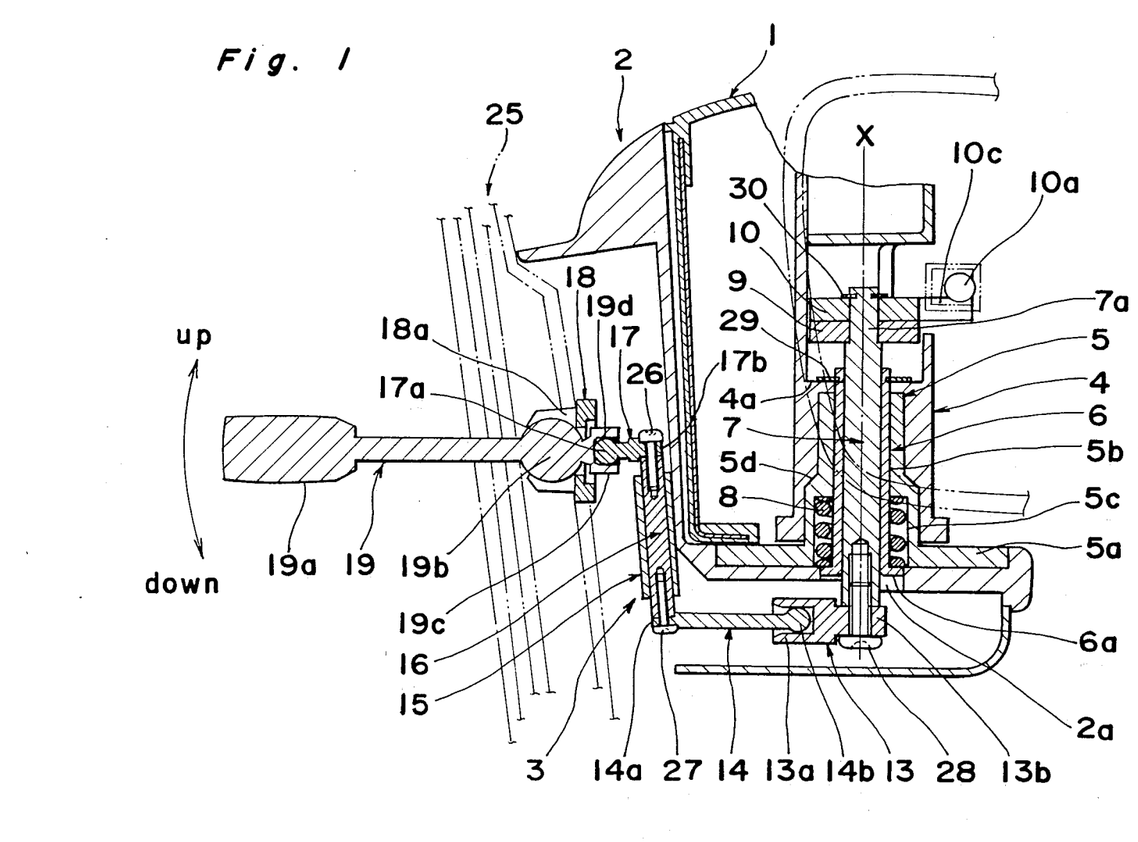
FIG. 1 is a sectional view of main portions of a mirror assembly with a manual angle adjusting device according to one preferred embodiment of the present invention.
Figure 2:
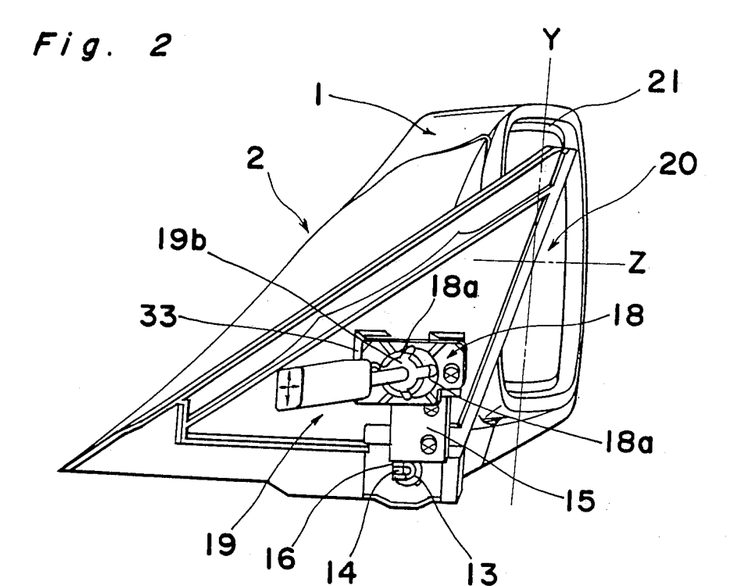
FIG. 2 is a perspective view of the mirror assembly of FIG. 1.
Figure 3:
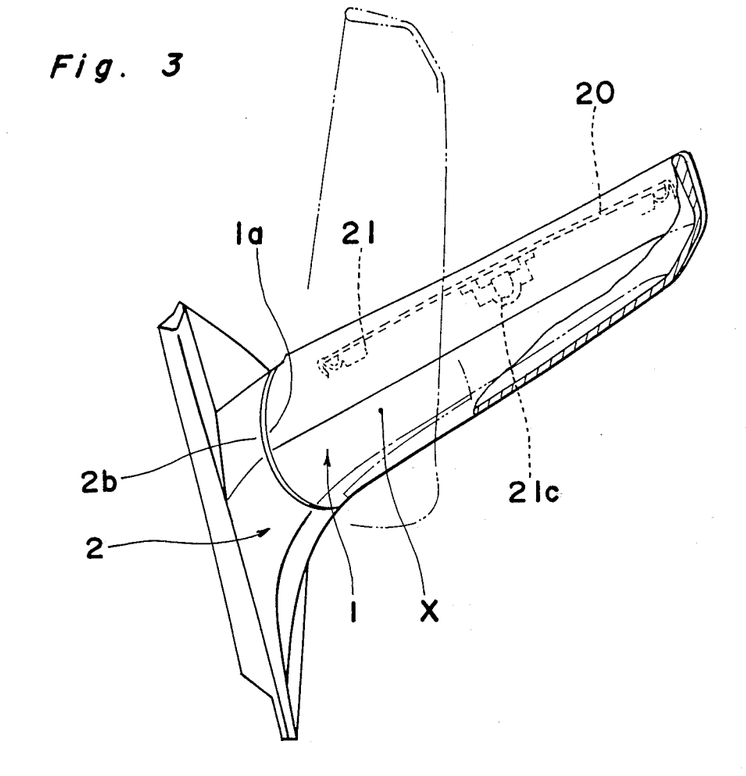
FIG. 3 is a top plan view of the mirror assembly of FIG. 1 with portions thereof broken away.

Referring first to FIGS. 1 through 3, there is shown a foldable type mirror assembly according to one preferred embodiment of the present invention having a mirror case 1 which accommodates a mirror 20 therein, and a mirror stay 2 mounted on an outer wall 25 of a motor vehicle such as a door or the like, with the mirror case 1 being rotatably installed on the mirror stay 2 with respect to a longitudinal direction of the motor vehicle in a horizontal plane in general, that is, with the mirror case 1 being rotatable around a rotational axis indicated by X which is set along a vertical direction in general. The mirror stay 2 is provided with a curved concave surface 2b having an axis concentric with the rotational axis X. The mirror case 1 is provided with a curved convex surface 1a corresponding to the above described concave surface 2b, both of which surfaces 1a and 2b form a boundary surface between the mirror case 1 and the mirror stay 2. On a lower surface, protruding outwardly, of the mirror stay 2 is mounted a cylindrical member 5 concentric with the rotational axis X, having a flange 5a at a lower end thereof and an inclined shoulder 5d on a side thereof. A cylindrical portion 4 of the mirror case 1 is engaged on a peripheral surface of the cylindrical member 5 to form rotary members together therewith and accordingly. The cylindrical portion 4 of the mirror case 1 is freely rotatable with respect to the cylindrical member 5 of the mirror stay 2. A cylindrical spacer 6 is engaged in a through-opening 5b of the cylindrical member 5 and has an upper end protruding upwardly over an upper surface 4a of the cylindrical portion 4 of the mirror case 1 for engagement of a retaining ring 29 thereon to hold the spacer 6 at its original position. A compression spring 8 is disposed in a space defined by a peripheral surface of the spacer 6, a flange 6a on its lower end and a concave portion 5c provided at a lower portion of the through-opening 5b in the cylindrical member 5. The cylindrical portion 4 of the mirror case 1 is urged toward the mirror stay 2 by the spacer 6 and the retaining ring 29, due to a spring force exerted by spring 8 preventing separation between the cylindrical portion 4 and the cylindrical member 5. Furthermore, a small clearance is formed between a lower surface of the cylindrical portion 4 and the flange 5a of the cylindrical member 5 for rotation of the mirror case 1 with the cylindrical portion 4 of the mirror case 1 in contact with shoulder 5d of the cylindrical member 5 under a certain pressure.

A penetrating shaft 7 is freely reciprocably and rotatably retained in the spacer 6. A lower end of the shaft 7 protrudes outwardly from the mirror stay 2 through an opening 2a defined at a lower surface of the mirror stay 2 and is connected to an operating lever 19 for tilting the mirror 20. The operating lever 19 penetrating through side wall 25 of a vehicle has one end provided with a knob 19a located inside the motor vehicle and the other end is provided with a connecting portion 19c inserted so as to extend to the mirror stay 2 through the side wall 25. The lever 19 is provided with a ball element 19b between its both ends in one unit. The knob 19a and the connecting portion 19c are freely rotatable around the ball element 19b of the lever 19, which element 19b is retained in a ball joint member 18 secured on the mirror stay 2 through a bracket 33. The ball joint member 18 is provided with a plurality of grooves 18a whereby the lever 19 is capable of freely rotating in both the vertical and horizontal directions. The connecting portion 19c of the above described lever 19 is a box-like member penetrating the ball joint member 18 and having a concave portion 19d at its end in the axial direction of the lever 19. A ball element 17a provided at one end of a third connecting member 17 is retained in the concave portion 19d so as to be freely rotatable in a longitudinal direction of the motor vehicle. The other end 17b of the third connecting member 17 is secured on an upper end of a connecting shaft 16 of second connecting members 3 by a screw 26. The connecting shaft 16 is retained, in a guide 15 secured on the mirror stay 2, so as to be capable of freely rotating and reciprocating vertically and approximately parallel to the axial direction of the shaft 7. The connecting shaft 16 is vertically supported by the shaft 7 etc. due to a resistant force generated by a guide pin 24, as described later, reciprocating in a guide cylinder 22b. One end 14a of a bent portion 14 of the second connecting members 3 is secured on the lower end of the above described connecting shaft 16 by a screw 27. The bent portion 14 extends in a direction approximately perpendicular to the axial direction of the connecting shaft 16. Accordingly, when the connecting shaft 16 is rotated around its axis by the third connecting member 17 upon rotation of the lever 19, the bent portion 14 is also rotated as one unit together with the connecting shaft 16 around the axis thereof By reciprocating the third connecting member 17, the second connecting members 3 comprising the connecting shaft 16 and the bent portion 14 reciprocates as one unit together with the third connecting member 17.

Figure 11:
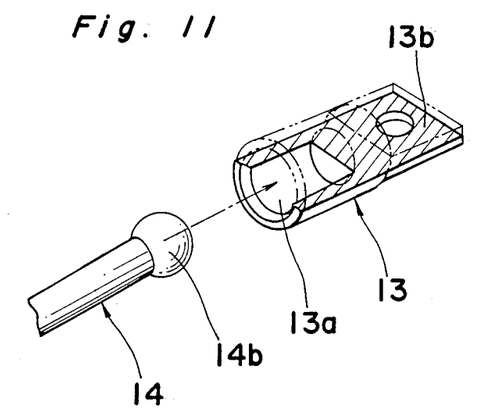
FIG. 11 is a perspective view on an enlarged scale and partly in section, showing a state where a bent portion of second connecting members is connected with a first connecting member.

The other end of the bent portion 14 is provided with a ball element 14b which is coupled in a cylindrical portion 13a forming one end of a first connecting member 13 so that the ball element 14b is capable of freely rotating in a longitudinal direction of the motor vehicle and freely moving in the cylindrical portion 13a as indicated in Fig. 11. The bent portion 14 can vertically move with the first connecting member 13 as one unit. The first connecting member 13 has the other end 13b secured on a lower end of the above described penetrating shaft 7 by a screw 28 so as to be reciprocable and rotatable around the axis of the shaft 7 as one unit with the shaft 7.

Figure 4:
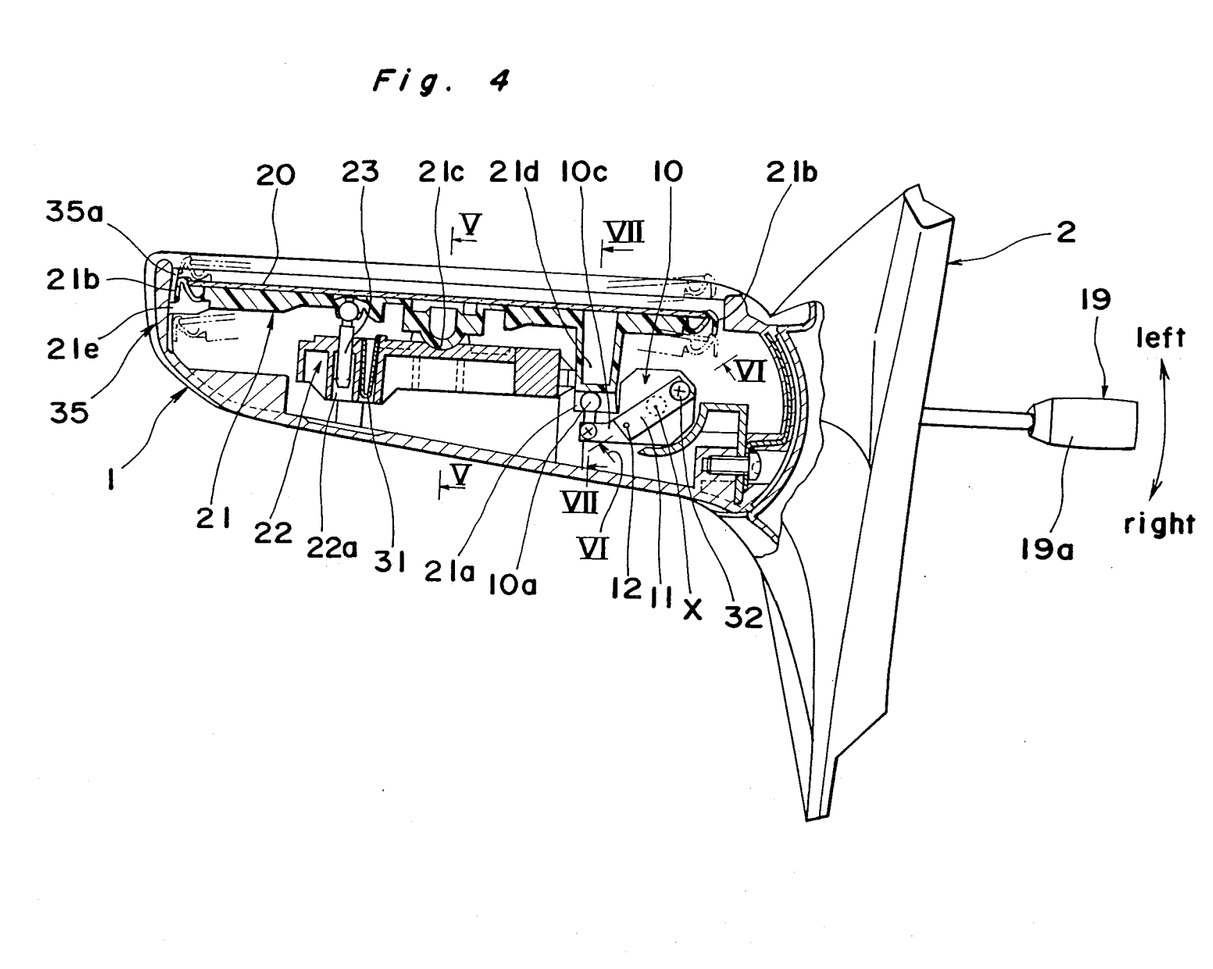
FIG. 4 is a cross sectional view of the mirror assembly of FIG. 1.
Figure 6:
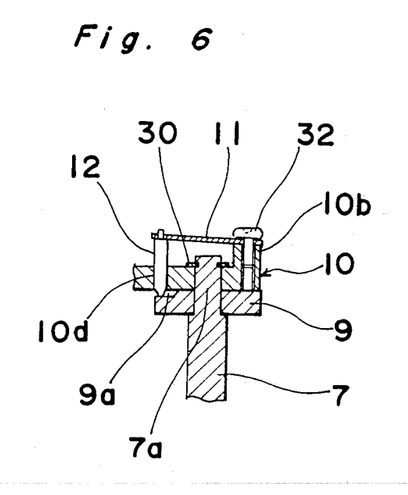
FIG. 6 is a sectional view of a connecting portion between a penetrating shaft and a clutch plate, on an enlarged scale, taken along the line VI—VI in FIG. 4.
Figure 9:
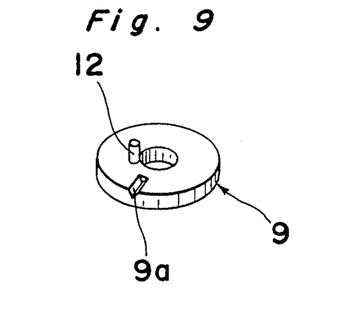
FIG. 9 is a perspective view of a pin and a disc as applied to the embodiment of FIG. 1.
Figure 10:
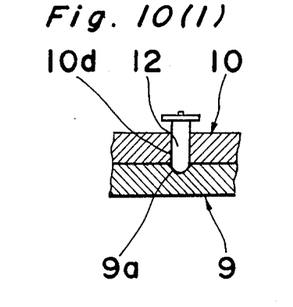

An upper end 7a of the shaft 7 has a smaller diameter than that of other portions and a disc 9 is rigidly secured thereon. A clutch plate 10 as a clutch member is retained on the above described upper end 7a by means of a retaining ring 30 so as not to come out of the shaft 7 while in contact with an upper surface of the disc 9 and rotatable around the shaft 7. A certain clearance is defined between a lower surface of the disc 9 and an upper surface 4a of the cylindrical portion 4 of the mirror case 1 so that the shaft 7 is vertically reciprocable with the disc 9. As shown in FIGS. 4 and 6, the clutch plate 10 has a protuberant portion 10b whereon one end of a flat spring 11 is secured by a screw 32, and a pin 12 protruding downwardly is arranged on the other end of the first plate 11. The pin 12, as shown in FIG. 9, penetrates a small opening 10d defined on the clutch plate 10 and a lower end of the pin 12 protrudes downwardly below a lower surface of the clutch plate 10 so as to be held in a retaining concave portion 9a defined on an upper surface of the disc 9. Accordingly, as indicated in FIG. 10(1), when the pin 12 is held in the retaining concave portion 9a on the disc 9, the clutch plate 10 rotates in one unit with the shaft 7 and the disc 9. On the other hand, when the clutch plate 10 receives an excessive torque over a predetermined value relative to the shaft 7, the clutch plate comes in a state wherein it can rotate regardless of the shaft 7 and the disc 9, with the pin 12 coming out of the above described retaining concave portion 9a against a spring force of the flat spring 11 as indicated in FIG. 10(2). The clutch plate 10 is further provided with an arm element 10c having a ball element 10a at an extreme point thereof and extending outwardly in a L-shaped state, at a opposite portion diagonal to the protuberant portion 10b of the clutch plate 10.

Figure 5:
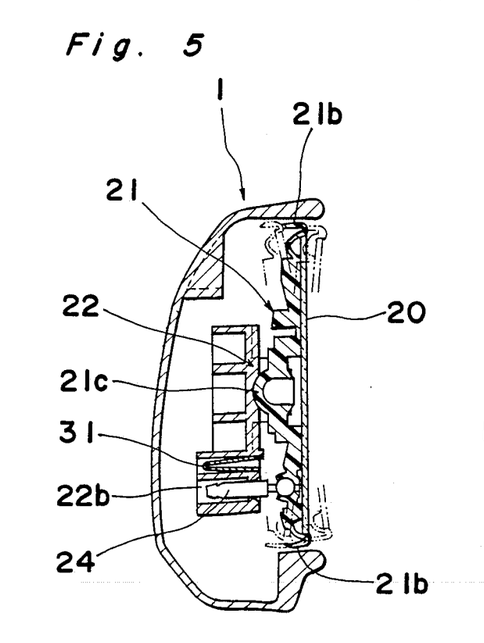
FIG. 5 is a longitudinal sectional view of the mirror case taken along the line V—V in FIG. 4.
Figure 7:
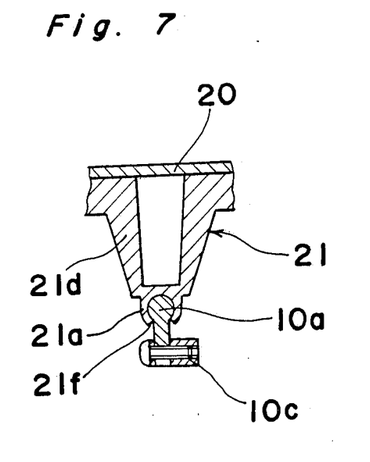
FIG. 7 is a sectional view of a connecting portion between a cylindrical portion of a cylindrical projection of a mirror holder and the clutch plate, taken along the line VII—VII in FIG. 4.
Figure 8:
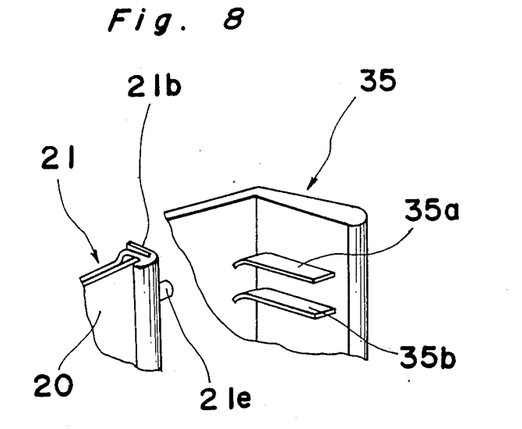
FIG. 8 is a perspective view of a main portion of a guide portion of the mirror holder as applied to the embodiment of FIG. 1.

In the mirror case 1 as shown in FIGS. 4 and 5, the mirror 20 is held on a mirror holder 21 made of synthetic resin, which is tiltably supported by an installation plate 22 installed on the mirror case 1 through a ball joint member 21c. Each of guide pins 23 and 24 is pivotably mounted on a central portion of the mirror 20 in a vertical or horizontal direction in the vicinity of the ball joint member 21c at a rear surface of the mirror holder 21, and is inserted into each of guide cylinders 22a and 22b arranged on the installation plate 22 for movement relative to the installation plate 22 in the axial direction thereof while affected by subjected to a constant frictional force by means of each spring 31. The above described friction force enables the mirror holder 21 to keep maintain a state thereof tilted at a desired angle. The mirror holder 21 is provided with a guide portion 21b bent toward inside of the mirror case 1 at a periphery thereof. A guide pin 21e (FIG. 8) is arranged on an outer surface of the guide portion 21b in a manner that the guide pin 21e is loosely engaged in between a pair of guide projections 35a and 35b on an outer frame 35 of the mirror case 1 so as to guide the mirror holder 21 tilting in a longitudinal direction of the motor vehicle. An axis between the center of the ball joint member 21c and the guide pin 21e is the rotational axis around which the mirror holder 21 rotates during tilting movement in a vertical direction. A cylindrical projection 21d is disposed in the vicinity of the ball joint member 21c at a rear surface of the mirror holder 21 and, for example, in case of a right side mirror as shown in FIGS. 2 and 4, it is arranged at a portion over a horizontal central axis Z and at the left side of a vertical central axis Y of the mirror 20. The cylindrical projection 21d FIG. 7 is provided with a cylindrical portion 21a divided into two portions in a horizontal direction of the mirror 20 by a slit 21f, at an extreme point thereof. Furthermore, the ball element 10a of the arm element 10c of the clutch plate 10 is retained in the cylindrical portion 21a so that the ball element 10a is capable of moving axially relative to the cylindrical portion 21a in a horizontal direction of the mirror 20 and moving vertically as one unit with the cylindrical projection 21d. The ball element 10a is retained in the cylindrical portion 21a and is prevented from coming out of the cylindrical portion 21a in a direction toward which the cylindrical projection 21d is protruding.

The functioning of the manual angle adjusting device of the mirror having the construction as described so far will be explained hereinafter.

When the lever 19 is rotated upwardly around the ball element 19b as viewed in FIG. 1, the connecting portion 19c, which is rotated downwardly around the ball element 19b as a result of the upward movement of the lever 19, makes the connecting shaft 16 of the second connecting members 3 move downwardly in the axial direction thereof through the third connecting member 17, while the connecting shaft 16 is guided along the guide 15. Accordingly, upon downward movement of the bent portion 14 and the first connecting member 13, the penetrating shaft 7 simultaneously moves downwardly relative to the spacer 6 with the clutch plate 10 and the disc 9. Furthermore, since the cylindrical portion 21a of the cylindrical projection 21d of the mirror holder 21 is connected to the ball element 10a of the arm element 10c of the clutch plate 10, a slight rotation of the cylindrical portion 21a relative to the ball element 10a results in the mirror 20 tilting upwardly through the mirror holder 21 which is tilted around the ball joint member 21c so that an upper portion of the mirror 20 is accommodated in the mirror case 1 and a lower portion thereof is protruded outwardly from the mirror case 1. On the contrary, when the lever 19 is rotated downwardly around the ball element 19b, the mirror 20 is tilted downwardly according to the counter functioning to the above described one.

When the lever 19 is rotated rightward as viewed in FIG. 4, that is, in a forward direction of the motor vehicle, the connecting portion 19c of the lever 19 is rotated around the ball element 19b in a backward direction of the motor vehicle and simultaneously, the second connecting members 3, as well as the third connecting member 17, are rotated around an axis of the connecting shaft 16 thereof in a contrary direction to the rotating direction of the above mentioned connecting portion 19c. Accordingly, the bent portion 14 of the second connecting members 3 and the first connecting member 13 are rotated in opposite directions to each other so as to be bent at an obtuse angle, and the penetrating shaft 7 is rotated rightward around its axis in one unit with the first connecting member 13. As a result, the clutch plate 10 rotated clockwise as viewed in FIG. 4, as well as the disc 9, presses the cylindrical portion 21a of the projection 21d of the mirror holder 21, through the ball element 10a of the arm element 10c of the clutch plate 10, and this results in the mirror 20 tilting leftward through the mirror holder 21 which is tilted around the ball joint member 21c so that a right portion of the mirror 20 is accommodated in the mirror case 1 and a left portion thereof is protruded outwardly from the mirror case 1. On the contrary, when the lever 19 is rotated leftward as viewed in FIG. 4, that is, in a backward direction of the motor vehicle, the cylindrical portion 21a of the projection 21d of the mirror holder 21 is moved toward inside of the mirror holder 21 by the ball element 10a of the arm element 10c of the clutch plate 10 and the mirror 20 is tilted leftward according to the counter functioning to the above described one.

When the mirror case 1 is folded by being rotated relative to the mirror stay 2, as shown by double dotted chain lines in FIG. 3, the cylindrical portion 4 of the mirror case 1 is rotated around the cylindrical member 5 of the mirror stay 2. At this moment, the clutch plate 10 receives a torque over a predetermined value against the shaft 7 through the mirror holder 21 by the mirror case 1 and the pin 12 mounted on the clutch plate 10 is released from the retaining concave portion 9a of the disc 9 so that the clutch plate 10 becomes freely rotatable relative to the disc 9 and the shaft 7. Furthermore, the mirror case 1 can be folded relative to the mirror stay 2 upon rotation of the mirror case 1 around an axis of the shaft 7. The cylindrical portion 21a of the projection 21d of the mirror holder 21 is maintained in engagement with the ball element 10a of the arm element 10c of the clutch plate 10. Also the shaft 7 is completely free from rotation. When the folded mirror case 1 is restored to its original position relative to the mirror stay 2, the mirror 20 will be in the same position as that before the mirror case 1 was folded.

According to the above described embodiment of the present invention, when the mirror case 1 is folded around the rotational axis X of the shaft 7 relative to the mirror stay 2, the ball element 10a of the clutch plate 10 is also rotated around the rotational axis X with the cylindrical portion 21a of the mirror holder 21. At this moment, the clutch plate 10 is capable of freely and independently rotating relative to the shaft 7 and the disc 9 and follows the rotation of the mirror case 1 due to pin 12 being released from the retaining concave portion 9b of the disc 9 against the spring force of the flat spring 11. The shaft 7 is not influenced by the rotation of the mirror case 1 during folding of the mirror case 1 and consequently, the connecting mechanism between the manual operating lever 19 and the mirror holder 21 is never damaged at the time the mirror case 1 is folded.

In addition, the mirror 20 can be easily adjusted to an operator's desired direction due to the tilting direction of the mirror 20 being the same as the operating direction of the lever 19. That is, when the lever 19 is rotated in a certain direction of either vertical or horizontal direction, the mirror 20 is tilted in the same direction as the direction the lever 19 is rotated.

Figure 12:
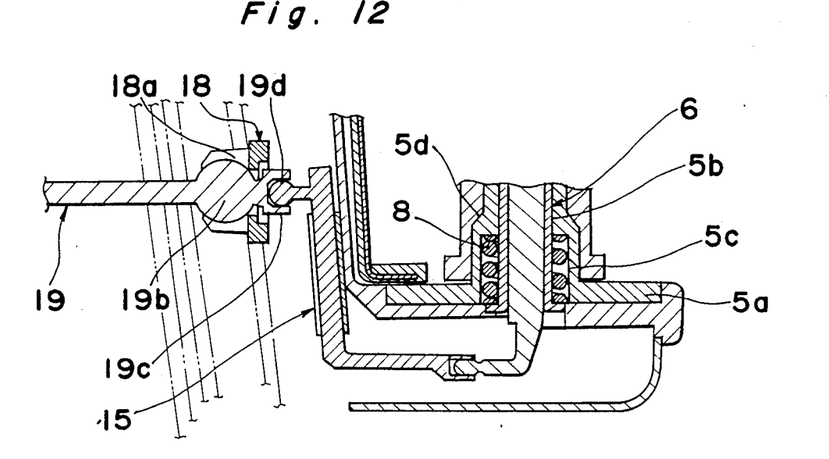
FIG. 12 is a sectional view of the connecting members showing a modification thereof.

It is to be noted here that, although the third connecting member 17 and the second connecting members 3 are produced in multiple pieces, these members can be produced as a single piece as indicated in FIG. 12 or can be an integral assemblage.

Figure 13:
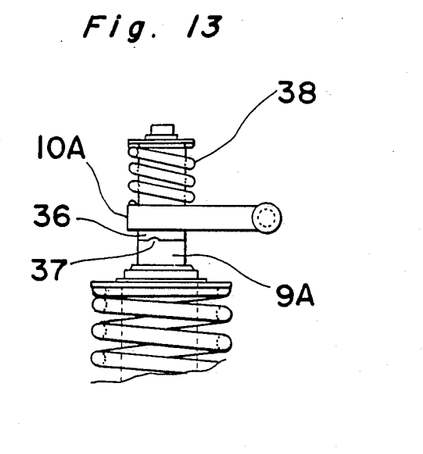
FIG. 13 is a front elevational view, on an enlarged scale, of a connecting portion between the penetrating shaft and the clutch plate showing a modification thereof.

It should also be noted that, although the clutch plate 10 can be rotated with the disc 9 through the engagement between the pin 12 mounted on the clutch plate 10 and the concave portion 9a disposed on the disc 9 toward which the pin 12 is urged by the flat spring 11, it may be so modified as shown in FIG. 13. The rotation of the clutch plate 10A together with the disc 9A can be done through the engagement between a concave portion 36 disposed on the clutch plate 10A and a convex portion 37 arranged on the disc 9A toward which the clutch plate 10A is urged by a coil spring 38.

Figure 14:
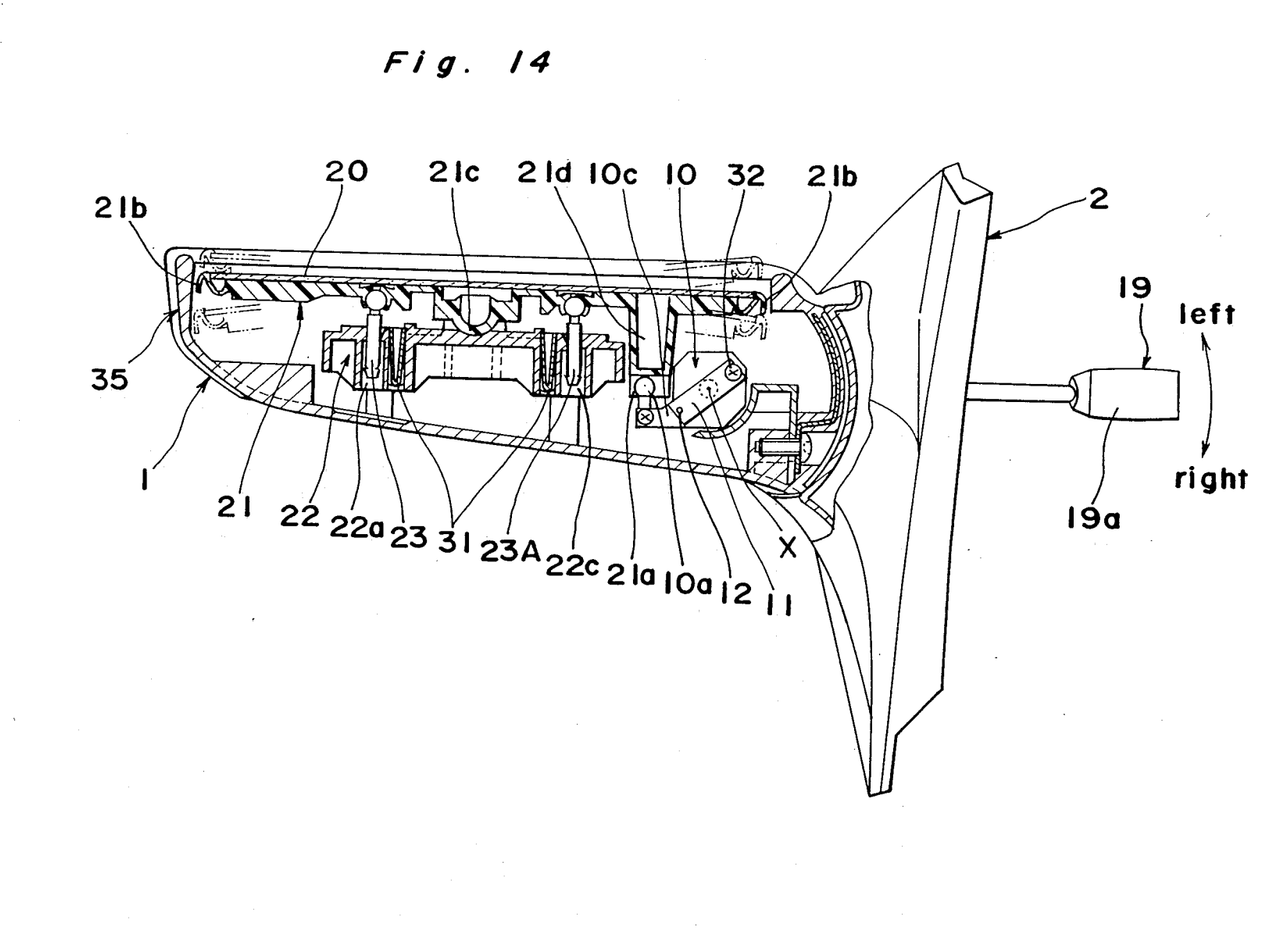
FIG. 14 is a cross sectional view of the mirror assembly showing a modification thereof.

It should be further noted that, although the guide pin 21e is arranged on the outer surface of the guide portion 21b in a manner that the guide pin 21e is loosely engaged in between a pair of guide projections 35a and 35b on an outer frame 35 of the mirror case 1 so as to guide the mirror holder 21 tilting in a longitudinal direction of the motor vehicle, the guide pin 21e and the guide projections 35a, 35b can be replaced by an additional guide pin 23A which is inserted into an additional guide cylinder 22c defined in the installation plate 22, as shown in FIG. 14.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A mirror angle adjusting device for use with a foldable type mirror assembly comprising a mirror stay, rotary members vertically arranged on said mirror stay, a mirror case rotatable around said rotary members, a mirror holder accommodated in said mirror case, a mirror rigidly mounted on said mirror holder and a ball joint member integrally formed with said mirror holder substantially at a central portion thereof, wherein said mirror together with said mirror holder is tiltable around said ball joint member either in a vertical or horizontal direction, said mirror angle adjusting device comprising:
a penetrating shaft vertically movably and rotatably mounted within the rotary members;
a clutch member having its rotational axis spaced from the ball joint member of the mirror holder, for connecting one end of the penetrating shaft with a connecting portion between the clutch member and the mirror holder, whereby the connecting portion can be moved in one unit with the penetrating shaft in a vertical direction for tilting the mirror together with the mirror holder in a vertical direction and can be rotated around the penetrating shaft not only in one unit therewith for tilting the mirror together with the mirror holder in a horizontal direction, but also independently, said connecting portion between the clutch member and the mirror holder being disposed at a position offset from said ball joint member of the mirror holder in a horizontal direction and away from said mirror therebehind;
a first connecting member secured on the other end of the penetrating shaft, said first connecting member rotating around the penetrating shaft and moving vertically in one unit therewith;
second connecting members provided with a connecting shaft approximately parallel to the axial direction of the penetrating shaft and a bent portion which extends in a direction approximately perpendicular to the connecting shaft and has one end connected to the lower end of the connecting shaft and the other end for engagement with the first connecting member so that the bent portion and the first connecting member are capable of rotating in opposite directions to each other and moving vertically in one unit;
a third connecting member secured on an upper end of the connecting shaft of the second connecting members and capable of moving vertically and rotating around the connecting shaft in one unit therewith; and
an operating lever having one end provided with a knob which is manually operated and the other end extending through the mirror stay outwardly for connecting the other end thereof with one end of the third connecting member so that the lever and the third connecting member are capable of moving vertically in one unit and rotating in opposite directions to each other, with the both ends of the lever being rotated around a ball element thereof, said ball element being integrally formed with said operating lever.

2. A mirror angle adjusting device as claimed in claim 1, wherein said first connecting member and said penetrating shaft are formed into a one-piece construction.

3. A mirror angle adjusting device as claimed in claim 1, wherein said second connecting members and said third connecting member are formed integrally with each other.

4. A mirror assembly comprising:
a mirror;
a mirror holder having a ball joint member, said mirror holder supporting said mirror;
a mirror case in which said mirror holder is adjustably mounted;
a mirror stay having a rotary support for rotatably supporting said mirror case; and
a manual angle adjusting device for adjusting the angle of said mirror relative to said mirror case comprising:
  a penetrating shaft having first and second ends substantially vertically movable and rotatably mounted within said rotary support of said mirror stay;
  a clutch member operatively connected to said first end of said penetrating shaft, said clutch member including a connecting portion operatively connected to said mirror holder in the vicinity of the ball joint member of said mirror holder, said connecting portion of said clutch member and said penetrating shaft are independently movable as a single unit in a substantially vertical direction and rotatable as a single unit about the axis of said penetrating shaft;
  a first connecting member operatively connected to the second end of said penetrating shaft, said first connecting member and said penetrating shaft are movable in the vertical direction and rotatable as a single unit;
  a second connecting member having first and second ends provided with a connecting shaft substantially parallel to the axial direction of said penetrating shaft, said first end of said second connecting member having a bent portion which extends in a direction substantially perpendicular to said connecting shaft, said bent portion is operatively connected to said first connecting member so that said bent portion and said first connecting member are capable of rotating in opposite directions relative to each other and are movable vertically as a single unit;
  a third connecting operatively connected to said second end of said second connecting member and are movable in a substantially vertical direction and rotatable around said connecting shaft as a single unit; and
  an operating lever having said first and second ends, said first end of said operating lever is provided with a knob, said second end extending through said mirror stay and operatively connected to said third connecting member, said operating lever having a ball element between its first and second ends for pivotably supporting said operating lever.

5. The mirror assembly according to claim 4, wherein said first connecting member and said penetrating shaft are of one piece construction.

6. The mirror assembly according to claim 5, wherein said second connecting member and said third connecting member are of integral construction.

7. The mirror assembly according to claim 4 including a disc mounted on said penetrating shaft adjacent and in contact with said clutch member, said disc including a concave portion on the side of the disc in contact with said clutch member, said clutch member including a flat spring and a pin, said flat spring biasing said pin through an opening in said clutch member into engagement with said concave portion of said disc forming a release mechanism for said mirror assembly when a torque of a predetermined value is exerted on said mirror assembly allowing it to rotate relative to said mirror stay.

* * * * *